Feb. 8, 1949.  W. T. HANNA  2,461,212
DEVICE FOR CONTROLLING THE SWING OF TRAILER VEHICLES
Filed Nov. 17, 1947  2 Sheets-Sheet 1
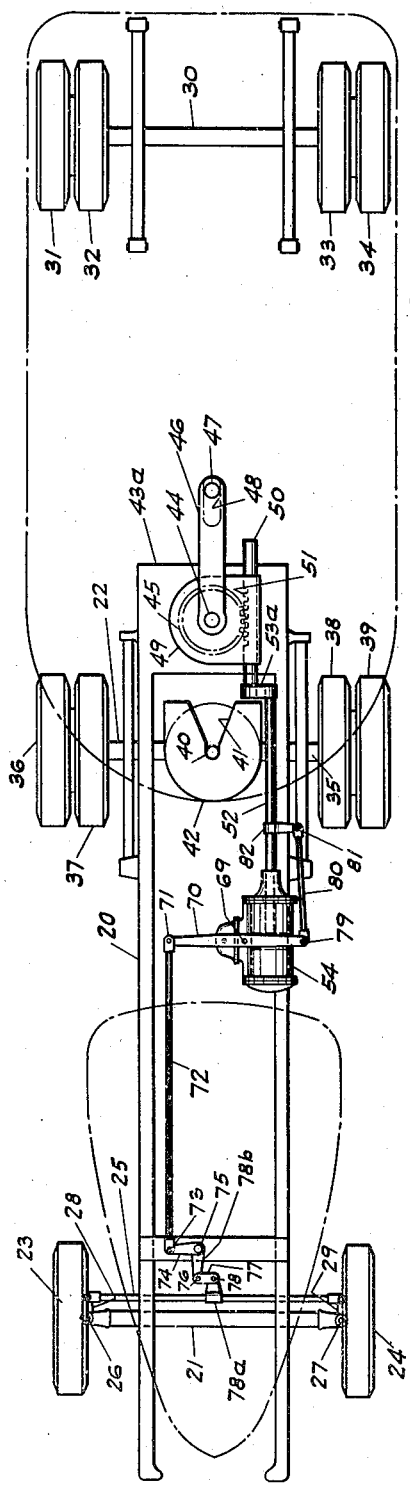
INVENTOR.
WILLIAM T. HANNA
BY
Des Jardins & Loughton
HIS ATTORNEYS

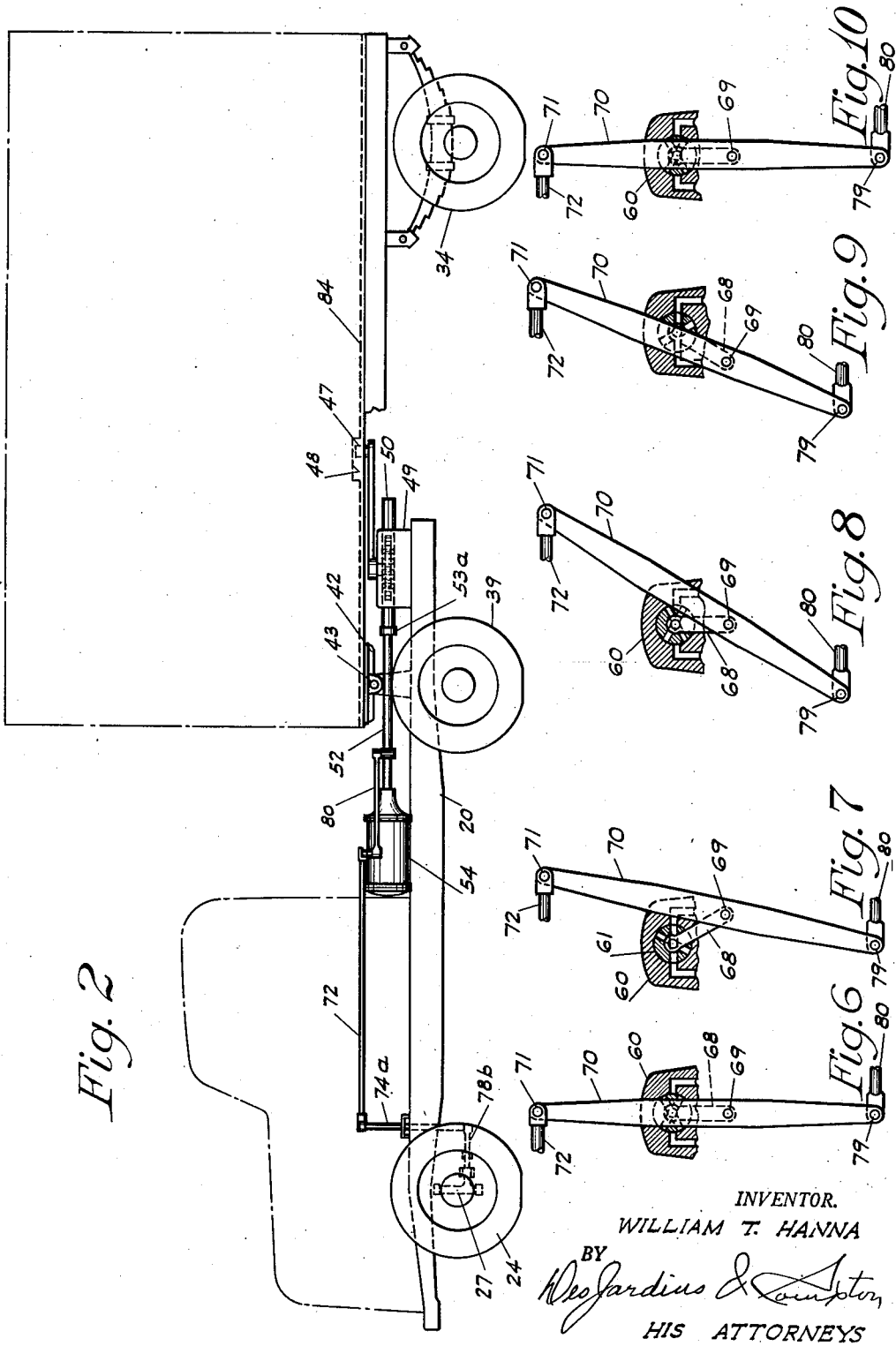

Patented Feb. 8, 1949

2,461,212

UNITED STATES PATENT OFFICE 2,461,212

DEVICE FOR CONTROLLING THE SWING OF TRAILER VEHICLES

William T. Hanna, Cincinnati, Ohio

Application November 17, 1947, Serial No. 786,469

17 Claims. (Cl. 280—33.05)

This invention relates to a device for controlling the swing of a trailer vehicle, and more particularly pertains to such a device, operated under combined control of the tractor vehicle steering apparatus and the swing of the trailer vehicle with respect to the tractor vehicle, for forcing the trailer vehicle, drawn by the tractor vehicle, to track therewith.

The novel device, in use, rigidly holds the trailer vehicle in adjusted longitudinal alignment with the tractor vehicle under conditions of rectilinear movement or constant curvilinear movement, but permits the trailer vehicle to deviate from such longitudinal alignment, when the tractor vehicle is turned, by the steering apparatus, one way or another, so as to permit it to come to a proper track with the tractor vehicle. Upon the operation of the steering mechanism of the tractor vehicle, from straight ahead position, a corresponding deviation of the trailer vehicle, from its then straight longitudinal alignment with the tractor vehicle, is permitted, whereupon the trailer vehicle and tractor vehicle are held in such deviated alignment. On return of the tractor vehicle to straight ahead position by operation of the steering mechanism, the trailer vehicle is permitted to swing back to its straight longitudinal alignment with the tractor vehicle, whereupon it becomes held secured in such alignment.

This device is for use with two-wheeled trailer vehicles, the wheels of which are located under the rear portion of the trailer bed, and which vehicles are primarily drawn by means of pins, projecting downwardly from the front end of the trailer vehicle bed, on its longitudinal center line. Such pins are ordinarily held in the center of a, so-called "fifth-wheel," which comprises a plate with a V-shaped slot therein, mounted on the rear end of the tractor vehicle, said slot ending in a central aperture located on the longitudinal center line of the tractor vehicle. Under ordinary circumstances, therefore, a trailer vehicle drawn by such a pin follows, or tracks, the tractor vehicle by entrainment therewith. With a heavily loaded trailer vehicle, especially when such vehicle is loaded so as not to be evenly balanced, there is a tendency for such vehicle to set up a dynamic response to vibrations caused by travel over rough roads, which commonly ends in a dangerous swinging or "fish-tailing" of the trailer vehicle. Another dangerous situation arises by reason of the tendency of a heavily loaded trailer to skid to a jackknifed position with reference to the tractor vehicle when the tractor vehicle suddenly stops. This phenomena occurs frequently when roadways are slippery and especially when a tractor vehicle and its trailer vehicle are rounding a curve.

It is an object of this invention to couple a tractor vehicle to its trailer vehicle, by a means additional to the primary coupling, selectively controlled by the movement of the steering mechanism, so that the trailer vehicle will always come to and be held in proper tracking alignment with the tractor vehicle whether on straight-away travel or on rounding curves.

Another object of the invention is to provide such a device which controls the tracking of a trailer vehicle with its tractor vehicle according to the degree of deviation from a set position that the steering wheels are turned.

Another object of the invention is to provide a fluid-type of torque coupling for use between a trailer vehicle and its tractor vehicle, in which the movement of the fluid is controlled by a valve actuated to open position from a normal closed position by movement of the steering mechanism from set position and which valve is returned to normal closed position upon the trailer assuming a deviation from previous alignment with the tractor vehicle according to the amount of turn given the steering wheels.

Another object of the invention is to provide controlled means for mechanically holding a trailer vehicle in an adjusted alignment with its tractor vehicle.

Another object of the invention is to provide mechanism which permits tracking of a trailer vehicle behind a tractor vehicle without danger of jackknifing.

Further objects, and objects relating to the details and economies of construction will definitely appear from the detailed description to follow. In one instance, I have accomplished the objects of my invention by the devices and means as set forth in the following specification. My invention is clearly defined and pointed out in the appended claims.

Structures, constituting the preferred embodiment of my invention, are illustrated in the accompanying drawings, forming a part of this specification, in which:

Fig. 1 is a plan view of the essential running gear of a tractor vehicle and its associated two wheeled trailer vehicle, primarily coupled together, by a standard pivot coupling, and additionally coupled by the novel swing control mechanism.

Fig. 2 is a plan view of the substance of Fig. 1.

Fig. 3 is a longitudinal section through the hydraulic cylinder and valve portion of the swing control device.

Fig. 4 is a section through the valve, showing the valve plug in full, and showing the crank and floating lever attached thereto.

Fig. 5 is a view of a typical floating lever provided with a plurality of pivot holes, to enable adjustment of it to different vehicles.

Figs. 6 to 10, inclusive, show, in sequence certain of the positions of the floating lever and valve crank during a left turn and recovery therefrom.

The same reference numerals are used for the same parts throughout the several views.

Referring, first, to Figs. 1 and 2, I show a tractor vehicle framework 20 supported on a forward axle 21 and a rearward axle 22. Front wheels 23 and 24 are rotatably mounted on axle-held steering knuckles 26 and 27, respectively, on which they are turned by steering arms 28 and 29 through tie rod 25. This comprises what will be called the steering mechanism, in the disclosure to follow, said mechanism being operable by any means, such as a steering wheel and gearing ordinarily used in such vehicles. Turning of the wheels one way is accompanied by an associated shift of tie rod 25, and, when the wheels are turned the other way, the tie rod 25 shifts in the opposite direction. This shift in the rod is used to control the novel mechanism to be described, although any other shifting or moving part in the steering mechanism could be used.

The rear end of the tractor vehicle is supported on axle 22 having on either end thereof a set of supporting and driving wheels comprising wheels 36, 37, 38 and 39. The trailer is provided with an axle 30 secured beneath the bed 84 of the trailer, crosswise thereof, near the rear end, and said axle has on either end thereof supporting wheels comprising wheels 31, 32, 33 and 34.

The front end of the trailer has a downwardly extending pin 40 (see Fig. 1) which fits into a V-shaped slot 41 on a fifth wheel 42 pivotally supported, as at 43, on the rear end of the tractor vehicle, in the well known manner. Pin 40 is on the longitudinal center line of the trailer vehicle and the central portion of the fifth wheel 42, into which the pin 40 is positioned, is on the center longitudinal line of the tractor vehicle. The pin 40 is held in the slot 41 by locking devices, which permits the tractor vehicle and the trailer vehicle, unless otherwise restrained, to swing with respect to one another around the center of pin 40. This is the ordinary mode of attaching such a trailer vehicle to such a tractor vehicle, and, in making turns, the longitudinal alignment of the tractor vehicle and the vehicle change to accommodate the system to the curve being rounded.

It is this free pivoting that the novel device, disclosed herein, controls, permitting such turning on the pivot only when the steering mechanism is actuated from a steady state of adjustment and then only to the degree of actuation of the steering mechanism from such state of steady adjustment.

Mounted on cross member 43a of the tractor vehicle, on a vertical stud 44 secured in said member 43a is a gear 45 having secured thereto, and extending rearwardly therefrom, an arm 46 having extending upwardly therefrom a stud 47 adapted to slidably engage in a slot 48 cut in the bottom of the bed of the trailer vehicle, the longitudinal axis of the slot being in the longitudinal center line of the trailer vehicle. As an alternative, the slot may be in the arm 46 and the stud attached to the trailer vehicle. Also attached to the member 43a is a cover plate 49 extending upwardly and over the gear and forming on one side thereof a housing in which a rack member 50 may slide back and forth longitudinally of the tractor vehicle, the teeth 51 on said rack member engaging the gear 45 so that, in the event that the tractor vehicle and trailer vehicle change in their alignment, around pin 40, the gear will be turned and the rack 50 will be shifted one way or another, accordingly.

Integral with rack 50 is a piston rod 52, connected to rack 50 by offset member 53a, said piston rod having on its other end a piston 53 (Fig. 3) reciprocable in a cylinder 54 attached to the frame of the tractor vehicle. The parts are so arranged that, when the tractor vehicle and the trailer vehicle are in straight alignment, the piston 53 is at or near the middle part of the cylinder, that is, at a mid-point between the limits of the full stroke of the piston in said cylinder. The cylinder is filled with fluid, such as commonly used in hydraulic devices, the fluid filling the cylinder except for that portion which is displaced by the piston, so that said fluid is on both sides of said piston. In the walls of the cylinder there is provided a port 55 and a port 56, at opposite ends of the cylinder, for passage of the fluid in or out thereof. Port 55 is connected by a passageway 57 to an exit port 58 coupled to a passageway 59 in a valve 60 provided with a rotatable plug 61, with cross passageways 62 therein, each, when the valve is turned to open position for that passageway, leading to passageway 63 which is coupled to passageway 64 which ends at port 56. By turning the valve plug 61 in either direction from normal position shown herein, in Fig. 3, the port 55 is connected to port 56 through one or the other of said plug passageways 62, permitting the piston 53 to move one way or another in the cylinder, the fluid traveling through the valve one way or another in response to such movement. That is, under conditions where the valve 61 connects ports 55 and 56, the piston is free to move in the cylinder, which means that the rack 50 (Fig. 1) may shift, permitting the trailer to swing one way or the other. When the valve 61 is closed, as shown in Fig. 3, the piston 53 is held stationary and, through piston rod 52, rack 50, gear 45, and member 46, the trailer is held in whatever aligned position it is then in, with respect to the tractor vehicle.

Referring to Fig. 4, the valve plug 61 has, secured on the stem 66 extending from the valve housing 67, a crank 68, pivoted, by pivot stud 69 on one end of a floating lever 70.

Referring to Fig. 1, one end of floating lever 70 is pivoted at 71 to a link 72 pivoted at its other end by pivot 73 to a lever 74 mounted on rod 74a, rotatably mounted at 75 to the tractor vehicle.

The other end of rod 74a has secured thereto a lever 78b pivoted at 76 to a link 77 pivoted at 78 to a bracket 78a secured to tie rod 25, so that, as tie rod 25 shifts, in response to operation of the steering mechanism, the link 72 will shift forwardly as a right turn is being made and shift rearwardly as a left turn is being made. The other end of floating lever 70 is pivoted, by pivot 79, to link 80 pivoted at 81 to a clamp 82 secured on piston rod 52.

It will be seen, by reference to Fig. 1, that, if pivot point 71 is stationary and pivot point 79 moves forwardly or backwardly in response to a shift of the piston, the pivot point 69 connected to the outer end of the valve crank is shifted accordingly. If the pivot point 79 is held stationary and the link 72 is shifted forwardly or rearwardly, the pivot 69 at the outer end of the valve crank is shifted accordingly. The direction of shift as link 72 moves to the rear, when pivot 79 is stationary, is such as to cause the crank 68 to turn counterclockwise, and if link 72 shifts forwardly the valve crank will shift clockwise. If piston rod 52 moves to the rear while pivot point 71 is stationary, the valve crank will move counterclockwise and, if piston rod 52 moves forwardly as pivot point 71 is stationary, the valve crank will move clockwise.

With the parts arranged as shown, if, for instance, the tractor vehicle is running in a straightforward direction with the trailer vehicle in straight longitudinal alignment therewith, and the driver of the tractor vehicle turns the front wheels to make a left turn, then link 72 will move rearwardly from the position shown in Fig. 6 to the position shown in Fig. 7, opening the valve 61 to permit fluid to pass from one side of the cylinder to the other, and, hence, the trailer vehicle is permitted to track with the tractor vehicle, gradually, causing forward movement of the rack 50 and piston rod 52, forcing link 80 forwardly as shown in Fig. 8. In opening the valve, the valve crank 68 was moved counterclockwise. As pivot point 71 is now stationary, it being assumed that the tractor vehicle wheels have been turned left, the movement forward of link 80 causes clockwise movement of crank 68, which closes valve 60 preventing the piston rod 52 from moving, thus holding the trailer vehicle in deviated alignment as the curve is being rounded. Fig. 9 represents the position of the parts as the link 72 is being drawn forward in response to the turning of the tractor vehicle wheels to a straight forward position, which, as pivot point 79 is now stationary, moves crank 68 in a clockwise direction, again opening the valve, and permitting the trailer vehicle to track with the tractor vehicle until it assumes a position of straight alignment therewith. As the link 72 comes to position of straight forward travel as shown in Fig. 10, the valve mechanism is brought to closed position at a point where the trailer vehicle is again in straight longitudinal alignment with the tractor vehicle. It should be understood that the successive positions of the mechanism shown in Figs. 6 to 10 are taken at various intermediate and end positions of the parts, and that, in actual movement of the parts, there is a gradual succession of intermediate positions while the parts are being brought to equilibrium position, where the valve is closed, such closure of the valve preventing any more movement of the rack 50 and hence preventing any more movement, in a swinging action, of the trailer vehicle. The time it takes to open the valve is, of course, dependent on how fast the steering wheels are turned.

Fig. 5 shows a floating lever 70 in which holes 83 are provided for adjusting the points at which pivot 79 shall be made, to render the mechanism adjustable for use with different vehicles.

The succession of steps of operation of the floating lever 70, in making a right turn, is the reverse of the succession of steps of operation in making the above described left turn, and the valve plug is provided with the two passageways 62 so that the valve works in one direction as well as the other, with the same response.

It will be understood from the foregoing that, after the steering mechanism has been brought to rest, the trailer vehicle is permitted sufficient swing, through the particular dimensions of the elements shown or by adjustment of the floating lever pivot point 79, as shown in Fig. 5, so that the trailer vehicle will accurately be brought to track with the tractor vehicle. Therefore, whether in straight ahead rectilinear movement or in continuous curvilinear movement, the trailer vehicle is always held in the necessary alignment with the tractor vehicle. It is only during the actual necessary change in alignment of the vehicles, demanded by the turning of the steering wheels, that the piston is permitted to move, and, therefore, that is the only time in which the tractor vehicle and the trailer vehicle are permitted to pivot with respect to one another.

The consequence of all this is that the rigid coupling of the tractor vehicle and the trailer vehicle, during normal traveling, is maintained until a change of direction is brought about by steering, and, after such change of direction has been accomplished, the rigid coupling again prevails.

I am aware that the structures herein described are susceptible of considerable variation without departing from the spirit of my invention, and, therefore, I claim my invention broadly as indicated by appended claims.

Having thus described my invention, what I claim as new and useful and desire to secure by Letters Patent is:

1. In a tractor-trailer vehicular system in which the tractor vehicle is equipped with steering mechanism, and wherein the trailer vehicle is pivotally connected at its front end to the tractor vehicle at a point to the rear of steering mechanism thereon, including, in combination, shiftable means coupled to the trailer vehicle and shifted in a direction and a distance corresponding to the swing of the trailer vehicle on its pivot; control means coupled to the shiftable means and normally holding it from shifting but operable to permit such shifting; means actuated by movement of the steering mechanism to operate the control means to permit such shifting of the shiftable means as to permit the trailer vehicle to track with the tractor vehicle; and means coupled to the shiftable means and to the control means to return the control means to normal holding condition when the trailer vehicle has come to tracking alignment.

2. The combination of claim 1 in which the trailer vehicle includes wheels under its rear end only.

3. The combination of claim 1 in which the shiftable means comprises a rack member which is coupled to the trailer vehicle through a gear, pivoted to the tractor vehicle, and an arm secured to the gear at one end and coupled at its other end to the trailer vehicle by a pin and slot coupling.

4. The combination of claim 1 in which the control means comprises a fluid-filled cylinder having a valve-controlled fluid passageway joining the cylinder ends, and having a piston which may be shifted in the cylinder when the valve is open, to which piston the shiftable member is coupled, and in which the valve is opened by operation of the steering mechanism and closed by the shifting of the shiftable means.

5. The combination of claim 4 in which the valve is equipped with a turning crank pivoted to a midpoint of a floating lever coupled at one end to the steering mechanism and coupled at its other end to the shiftable means.

6. In a device of the class described, the combination of a tractor vehicle including a frame structure provided with steering mechanism; a trailer vehicle including a frame structure pivotally connected to the frame structure of said tractor vehicle; a hydraulic device including a piston movable in a fluid-filled cylinder, a fluid passageway communicating with each end of said cylinder, and valve means in said passageway; an operative connection between said steering mechanism and said valve for opening said valve upon actuation of said steering mechanism; an operative connection between said piston and said trailer vehicle for moving said piston upon displacement of said trailer vehicle angularly, relative to said tractor, around the pivot connection; and an operative connection between said piston and said operative connection between said steering mechanism and said valve for closing said valve upon completion of said trailer displacement.

7. The combination of claim 6 in which the trailer vehicle has running wheels only under its rear end and is pivotally coupled at its front end to the tractor vehicle to the rear of the steering mechanism.

8. The combination of claim 6 in which the valve is operable by a crank, in either direction, from a normally closed position to an open position, depending on the direction of actuation of the steering mechanism.

9. The combination of claim 6 in which the operative connection between the piston and the trailer vehicle comprises a shiftable rack in engagement with a gear pivoted on the tractor vehicle, said gear being coupled to the trailer vehicle by a pin and slot connection so that the displacement of the trailer is reflected in the shift of the rack which is coupled to the piston.

10. A device for additionally coupling a tractor vehicle equipped with steering mechanism to a two-wheeled trailer vehicle primarily pivotally coupled to the tractor vehicle, including, in combination, a member coupled to the trailer vehicle and moved a distance proportional to and in a direction determined by the swinging of the trailer vehicle around its pivot; a member moved by the steering mechanism proportional to and in a direction determined by movement of the mechanism; and means controlled jointly by the movement of the member attached to the trailer vehicle and by movement of the member moved by the steering mechanism to hold the trailer vehicle against swing around its pivot except in an amount to permit it to track with the tractor vehicle.

11. The device of claim 10 in which the swing of the trailer is controlled through holding and freeing said member attached to the trailer vehicle.

12. The device of claim 10 in which the means to control the swing of the trailer includes a cylinder, a piston shiftable in the cylinder and having a piston rod extending therefrom, a valve-controlled by-pass duct connecting the ends of the cylinder, and a fluid filling the cylinder and by-pass duct and in which the valve is controlled jointly by trailer swing and steering mechanism movement.

13. A device for additionally coupling a tractor vehicle equipped with steering mechanism to a two-wheeled trailer vehicle primarily coupled to the tractor vehicle by a pivot pin, including, in combination, a fluid-containing cylinder equipped with a piston having a piston rod extending exteriorly thereof and having an external passageway equipped with a normally closed valve which, when open, permits passage of fluid from one side of the piston to the other to permit the piston to move; means coupling the piston rod to the trailer vehicle to one side of the pivot pin to normally hold the tractor vehicle and trailer vehicle in alignment according to the piston position, but so as to permit the trailer vehicle to pivot one way or another, if the piston is permitted to move, in a direction associated with the direction of piston movement and a distance proportional thereto; and means coupled jointly to the valve, to the steering mechanism, and to the piston, to open and close the valve to permit the piston to move and the trailer to swing in a direction and a distance proportional to the movement of the steering mechanism.

14. The device of claim 13 in which the valve is operated by a crank and in which the means coupled to the valve is coupled to the crank and comprises a floating lever pivoted at one end to the steering mechanism, at the other end to the piston rod, and coupled at a midpoint to the valve crank.

15. The device of claim 14 wherein the valve has a normal closed position but is turnable by the crank, in either direction, from normal, to an open position, and wherein the floating lever is coupled pivotally to the end of the crank.

16. A device for additionally coupling a tractor vehicle equipped with steering mechanism and primarily coupled to a two-wheeled trailer vehicle by means of a pivot coupling, including, in combination, a gear mounted on the tractor vehicle to the rear of the pivot point and said gear having integral therewith a rearwardly extending arm pivotally coupled at its rear end, by a pin and slot connection, to the trailer vehicle; a rack shiftably mounted on the trailer vehicle and in engagement with the gear, so that the swing of the trailer vehicle relative to the tractor vehicle causes the rack to shift one way or the other; a closed fluid-filled cylinder equipped with a piston and having a piston rod extending exteriorly thereof, said extended portion of the piston rod being connected to the rack, so that the rack shifts with the piston, and said cylinder having a fluid port at either end; means connecting said ports, externally of the cylinder for fluid transfer, said connecting means including a valve turnable either way from a normal closed position to an open position, and said valve being equipped with a crank for turning; a lever pivoted at a midportion to the crank end, pivoted at one end to a member secured to and moving with the piston rod, and pivoted at its other end to the steering mechanism of the tractor vehicle so the lever is shifted one way or the other as the steering mechanism is operated one way or another from a set condition, the parts being so proportioned and adjusted, relatively, that the valve remains open upon operation of the steering mechanism until the trailer swings to track with the tractor vehicle, whereupon the valve is closed, the described additional coupling then holding the trailer and tractor in such tracking position until the next movement of the steering mechanism.

17. In a tractor-trailer vehicular system in which the tractor vehicle is equipped with steering mechanism, and wherein the trailer vehicle is pivotally connected at its front end to the tractor vehicle at a point to the rear of the steering mechanism thereon, including, in combination, movable means supported upon one of said vehicles, operatively connected to the other of said vehicles and susceptible to movement in either direction from a substantially midway position to an extent corresponding to the angular displacement of one of said vehicles relative to the other when the vehicular system is traveling on a curve; a device normally restraining said movable means from action; control means actuated by the movement of said steering mechanism to cause said device to release said movable means; and means to effect restoration of said control means to restraining condition upon completion of said angular displacement of said vehicles.

WILLIAM T. HANNA.

No reference cited.